United States Patent Office 3,421,678
Patented Jan. 14, 1969

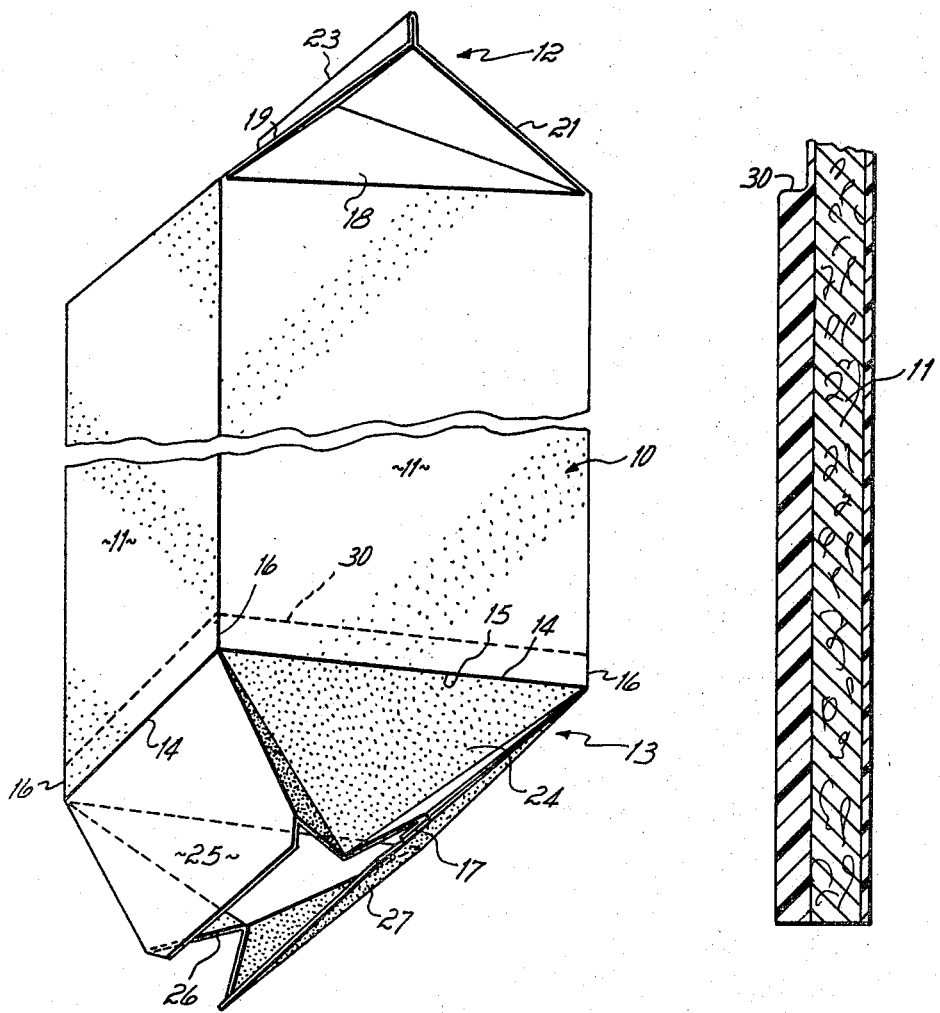

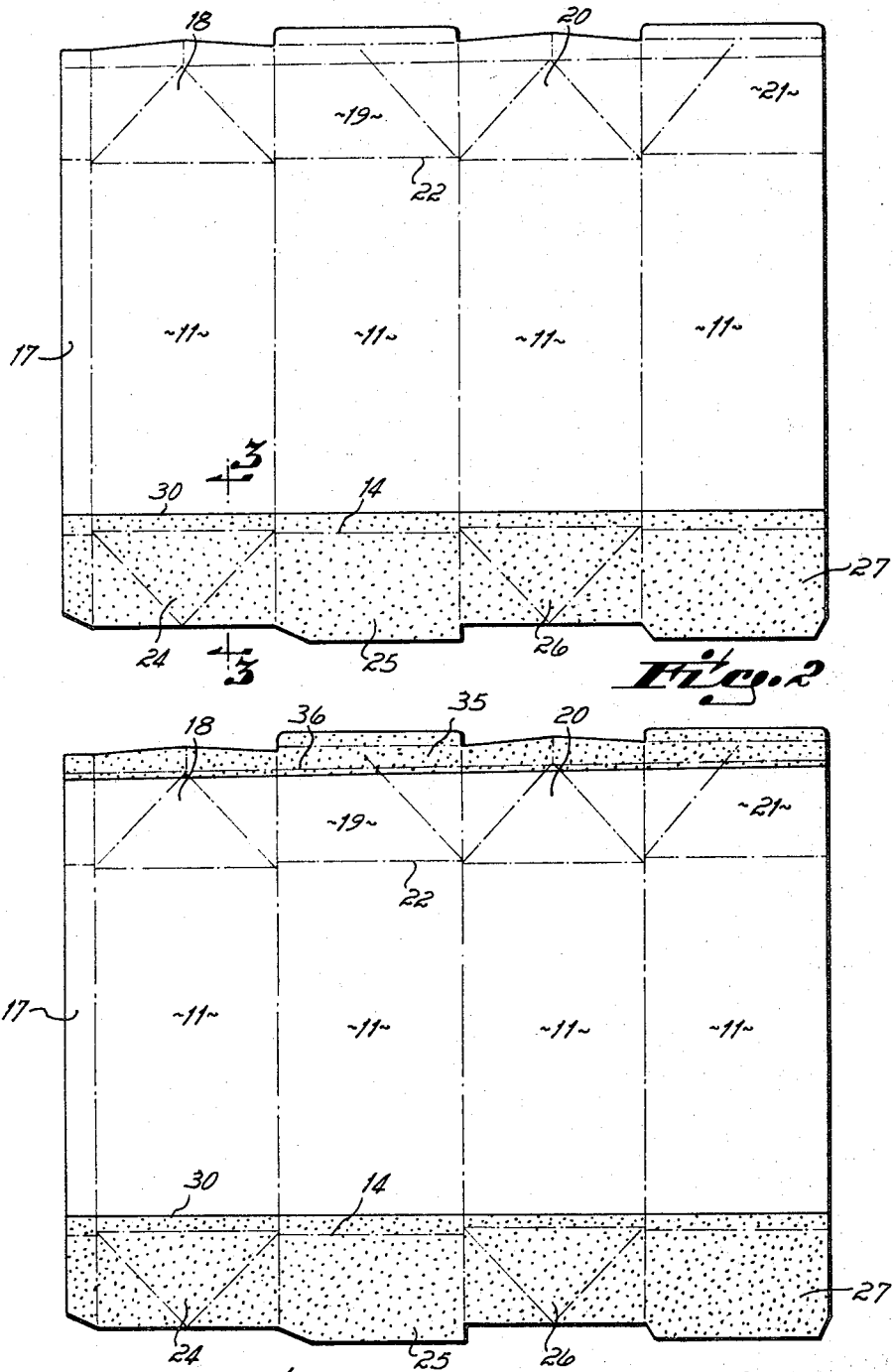

3,421,678
PROFILE COATED CARTON
Kenneth Thompson, Waynesville, N.C., and Richard C. Ihde, Parma Heights, Ohio, assignors to U.S. Plywood-Champion Papers, Inc., Hamilton, Ohio, a corporation of Ohio
Continuation-in-part of application Ser. No. 559,929, June 23, 1966. This application Oct. 9, 1967, Ser. No. 673,681
U.S. Cl. 229—3.1　　　　　　　　　　　　　7 Claims
Int. Cl. B65d 5/40; B65d 5/56; B05c 3/18

ABSTRACT OF THE DISCLOSURE

A paperboard carton for liquids in which the inside surface of the carton is coated with a film of thermoplastic material, the thickness of the film being greater in the areas of greater stress.

---

This is a continuation-in-part of our copending application Ser. No. 559,929, filed June 23, 1966, now abandoned.

The present invention is directed to a carton which is formed in part through the method and apparatus of copending application Ser. No. 530,119, filed Feb. 25, 1966.

For many years, cartons for milk and similar liquids were formed in part by setting up a preformed blank with the bottom of the carton closed and dipping the carton in molten paraffin to seal it. Therefore, the carton was filled and its top closed.

The wax or paraffin coated carton has been almost entirely supplanted by the polyethylene coated carton. The manufacture of the latter carton is different from the wax coated carton in several material respects. Instead of applying the sealing coating after the carton is almost completely formed, the coating of polyethylene is applied to the paperboard by extruding it as a thin film onto the paperboard as one of the earliest steps in the formation of the carton and before any of the other steps are performed such as cutting, scoring, folding, and the like. After coating with polyethylene, the board is cut, scored, folded and its bottom structure is sealed by applying heat to the overlapping flaps or panels by which the bottom structure is formed, the heat bringing the polyethylene to that state of fluidity which permits a bond to be formed between adjacent surfaces. A small percentage of the cartons formed in accordance with present practices develop leaks. The leaking may occur through one of a number of causes such as the weakening of the polyethylene through the scoring operation or the degradation of the film during the application of the heat during heat sealing. In any event, any loss of integrity in the polyethylene film becomes the location of a possible leak which can be created through the action of the fluid contained in the carton during the handling of the carton. The repeated handling of the filled carton causes a repeated flexing of the walls of the carton about the bottom score lines and a consequent fatiguing of the material and creation of leaks.

Two approaches have been made toward solving the problem of leaking. First is the standardizing of the minimum amount of thermoplastic coating permitted. For example, in half gallon cartons, the minimum coating on the inside surface is 17 pounds per ream which results in a coating thickness of approximately 1.18 mils. The gallon carton requires a minimum coating of 21.6 pounds per ream which results in a coating thickness of approximately 1.5 mils.

Additionally, the carton has been strengthened against leaking through the design of the carton bottom structures as disclosed in Patent 3,120,333, for example. There, the patentee has described a specific panel or flap structure by which the bottom of the carton is formed, the structure being designed to provide additional paperboard in the critical areas of the bottom structure to minimize the possibility of leakage.

In the somewhat different art of closure caps, Patent No. 2,244,282 discloses a cap having corners and creases to which an extra heavy film of thermoplastic coating is applied to avoid leakage.

This approach has two disadvantages which tend to suggest its unsuitability for mass produced milk cartons and the like. The first is the difficulty or impossibility of selectively applying a bead or globule of thermoplastic coating material at the precise location of the leak forming creases. Second, the price competition in these cartons is so great that to add to the cost of making them by adding additional material to the carton would be to price the carton out of the market.

The essence of the present invention resides in the providing of a carton for liquids in which the thermoplastic coating is markedly reduced in thickness over all surfaces above the bottom structure of the carton and in which the thermoplastic coating is increased in thickness over all of the bottom forming structure. More specifically, the blank from which the bottom structure is formed consists primarily of four panels which are connected together by score lines and which are connected to the remainder of the carton along a major horizontal score line. In such a blank, a band of extra thick thermoplastic coating covers the bottom forming panels and extends a slight distance beyond the major horizontal score line toward the upper portion of the carton forming structure.

By applying the concept of the invention, it has been found in practice that the overall quantity of thermoplastic coating can be reduced by more than 25 percent while increasing the liquid tight character of the catron.

A further feature of the invention, which is particularly applicable to cartons having a gable top structure, resides in the application of a narrow strip of thicker film to those areas which participate in the sealing of the top. This added film assures a superior heat seal while still achieving economies in the cost of the applied thermoplastic.

The invention will be more readily understood from the following detailed description taken in conjunction with the accompanying drawings in which:

FIG. 1 is a perspective view of the carton with the bottom flaps in a partially closed condition, FIG. 2 is a plan view of the carton forming blank, FIG. 3 is an enlarged cross sectional view taken along lines 3—3 of FIG. 2, and FIG. 4 is a plan view of the carton forming blank showing an alternative form of the invention.

A carton formed in accordance with the present invention is illustrated in FIG. 1. The carton 10 has vertical walls 11, a top structure 12, and a bottom structure 13. The top structure 12 is folded in a conventional manner, for example, as illustrated in Patent 3,116,002 and is adapted to seal the liquid contents within the carton and further is adapted to be opened in such a way as to form a pouring spout for the liquid contents. The bottom structure likewise is folded in a conventional manner as, for example, described in Patent 3,120,335. It is the bottom structure with which the present invention is particularly concerned.

The bottom structure is formed by folding bottom closure panels on a major horizontal score line 14 (FIG. 2) to form the bottom corner structure 15. As indicated above, the paperboard with which the carton is formed is first coated on both sides with polyethylene or some other suitable thermoplastic material. The temperature of the coating is raised to the extent necessary to fuse the thermoplastic material and form a bond between adjacent panel members, and thereafter the bottom closure forming panels are folded with respect to each other with the plastic coated surfaces being brought into contact under pressure thereby effecting the sealing of the bottom structure.

In the use of the carton, the fluid content moves as the carton is transported from the dairy to the consumer and the hydraulic forces attending the movement of the carton stress the carton, particularly in the area of the major horizontal score line 14 and at the vertical corner portions 16 at the lower end of the carton. The repeated stressing of these areas, which are already weakened somewhat by the scoring, folding, and heating during heat sealing, causes leaks to be developed. The present invention minimizes the leaks while at the same time reduces the overall cost of the carton by reducing the amount of thermoplastic material required to provide the liquid-tight carton.

Referring to FIG. 2, a blank of the type from which a carton is formed is illustrated. The blank includes four vertical walls 11 and a side seam flap 17. At the upper end of the blank, four top forming panels 18, 19, 20, and 21 are connected to the walls 11 along a top major horizontal score line 22. These panels will, after the carton is filled, be folded together and sealed along a ridge 23 (FIG. 1) to form the top structure of the carton.

At the bottom of the carton, four panels 24, 25, 26, and 27 are joined together and are hinged to the vertical walls 11 along the bottom major horizontal score line 14. The bottom closure forming panels are, in forming the carton, folded with respect to one another in overlapping relation and heat sealed to form a leak-tight bottom structure.

In a conventional half gallon container, the inside surface of the carton is normally coated with 17 pounds of thermoplastic material per ream of paperboard coated, polyethylene normally being used as the thermoplastic material. This quantity of thermoplastic material normally produces a coating thickness of 1.18 mils. The gallon container is normally coated with 21.6 pounds per ream which results in a coating thickness of 1.5 mils. Even with this substantial quantity of polyethylene, leakers in relatively substantial numbers do develop.

In accordance with the present invention, the coating on the outside surface is unchanged but an increased thickness of thermoplastic material is applied to the blank on its inside surface to cover an area 30 of the carton overlying the bottom closure panels 24–27 and to extend beyond the major horizontal score line a short distance as, for example, one-half inch. In the half gallon container, the thickness of the coating over the area 30 is approximately 1.5 mils. The thickness of the coating over all of the remaining area which is subjected to considerably less stress is approximately 0.75 mil. The area 30 is approximately 25 percent of the carton blank and the remaining area is approximately 75 percent of the carton blank. The average coating per ream of inside surface is 13.5 pounds per ream as contrasted to the 17 pounds per ream conventionally required. Thus, in respect to the half gallon container, the practice of the invention results in a saving of almost 3.5 pounds of coating per ream. Not only is the total weight of coating material reduced through the practice of the present invention but more importantly the resistance of the cartons to leaking is greatly improved. The actual use of the invention in the field appears to have brought about a substantial reduction in leaker complaints.

The reduction in coating material is even more dramatic in the gallon containers. Present standards require a 1.5 mil thick coating which is produced by applying 21.6 pounds per ream. In accordance with the invention, the thickness of the coating in the area 30 is increased to approximately 1.74 mils and the thickness of the coating over the remaining areas of the carton is reduced to approximately .87 mil. To produce the carton in accordance with the invention, approximately 15.5 pounds of coating material per ream is required on the inside surface, resulting in a saving of over 28 percent. As in the case of the half gallon containers, the reduction in the coating material has not had any detrimental effect on the carton but rather the number of leakers has been reduced.

As shown in FIG. 4, the sealing of the top structure can also be improved by applying the principles of the invention. A narrow strip 35 of thicker film is applied to the marginal edge portions of top forming panels 18, 19, 20 and 21. After the carton is filled, these marginal edge portions are brought together under heat and pressure to form the ridge seal 23. The increased thickness of the strip 35 improves the seal.

The thickness of strip 35 need not be as great as at 30 but it should be substantially thicker than the film over the major portion of the walls. Its width is great enough to extend slightly over an upper horizontal score line 36 which defines the ridge forming portions, and is preferably no more than one inch.

The coating material applied to conventional cartons is compared to that applied to cartons formed in accordance with the present invention in the following table:

| | Conventional | | Invention (Fig. 2) | | | | Invention (Fig. 4) | | | | |
|---|---|---|---|---|---|---|---|---|---|---|---|
| | Film thickness (mils) | Lb. per ream | Film thickness | | Lb. per ream | Total savings, lb. per ream | Film thickness | | | Lb. per ream | Total savings, lb. per ream |
| | | | Lower area (mils) | Upper area (mils) | | | Lower area (mils) | Side wall area (mils) | Upper area (mils) | | |
| Quart | 1.11 | 16.0 | 1.39 | 0.70 | 12.1 | 3.9 | 1.39 | 0.70 | 1.18 | 12.9 | 3.1 |
| ½ gal | 1.18 | 17.0 | 1.50 | 0.75 | 13.5 | 3.5 | 1.50 | 0.75 | 1.25 | 14.3 | 2.7 |
| 1 gal | 1.50 | 21.6 | 1.74 | 0.87 | 15.5 | 6.1 | 1.74 | 0.87 | 1.39 | 16.2 | 5.4 |
| 2 gal | 1.75 | 25.2 | 2.00 | 1.00 | 17.0 | 8.2 | 2.00 | 1.00 | 1.46 | 18.5 | 6.7 |

The foregoing table sets forth preferred weights or thicknesses of coating material in the upper and lower portions of the carton. It should be understood that these amounts are subject to variation, depending upon particular applications. In general, however, the range of coating thickness at the bottom portion of the carton should be between 1.0 and 2.0 mils and the corresponding range of thickness on the side walls of the carton should be between 0.5 and 1.0 mil. Preferably, a ratio of 2:1 between the bottom thickness and the side wall thickness should be maintained. Similarly, the film thickness of the sealing strip 35 should be approximately 1.5 times the thickness of the film on the wall.

What is claimed is:
1. A carton for liquids comprising:
   a paperboard tube,
   an integral extruded coating of a thermoplastic material covering at least the inside surface of said tube, said thermoplastic coating being approximately twice as thick at the lower end portion of said tube as at the upper portion of said tube, and the thickness of the thermoplastic material in the lower end portion being approximately in the range of 1.0 to 2.0 mils and the thickness in the remainder of the tube being approximately in the range of 0.5 to 1.0 mil,
   said tube having means within the lower end portion of said tube forming a sealed bottom structure,
   said tube being formed from paperboard which was cut and scored after coating with said thermoplastic material.

2. A carton according to claim 1 in which the thicker coating extends above the sealed bottom structure of the carton.

3. A carton according to claim 1 in which said coating is polyethylene and is applied to both sides of said carton, the coating on the outside surface being of uniform thickness.

4. A carton according to claim 1, said carton having a gable top structure including a sealed ridge, the inside surface of said carton at said ridge being coated with a film which is approximately 1.5 times the thickness of the thinner coating on upper portion of the tube.

5. A carton blank for liquids comprising:
a paperboard sheet,
longitudinally extending score lines for forming vertical corners of said carton,
score lines at one end of said blank for forming a top structure,
score lines at the other end of said blank for forming a bottom structure,
a coating of thermoplastic material covering said blank, said coating at the other end of said blank overlying the bottom forming score lines being approximately twice as thick as the coating over the remainder of the blank, the thicker coating being approximately 1.0 to 2.0 mils thick and the remainder of the coating being approximately in the range of 0.5 to 1.0 mil thick,
said blank having been cut and scored after coating with said thermoplastic material.

6. A blank according to claim 5 in which said bottom forming score line includes a major horizontal score line extending transversely across said blank, said thicker coating extending from the lower edge of said blank to a line beyond said major horizontal score line.

7. A blank according to claim 6 in which said top forming score lines include an upper horizontal score line defining ridge forming portions, and a thicker coating applied from the upper edge of said blank at least to said supper score line.

References Cited

UNITED STATES PATENTS

| | | | |
|---|---|---|---|
| 2,676,745 | 4/1954 | Geisler | 229—3.1 XR |
| 3,111,715 | 11/1963 | Hofer | 117—45 XR |
| 3,120,335 | 2/1964 | Egleston et al. | 229—43 |
| 3,167,231 | 1/1965 | Bray | 229—176 |
| 3,207,410 | 9/1965 | Dobbins et al. | 229—3.1 |
| 3,212,697 | 10/1965 | Anderson | 229—5.1 XR |
| 3,305,383 | 2/1967 | Gordy | 117—44 XR |

DAVIS T. MOORHEAD, *Primary Examiner.*

U.S. Cl. X.R.

117—44; 161—68; 229—17